H. B. MORRIS.
METHOD OF MANUFACTURING MATERIAL FOR MAKING ARTICLES OF FURNITURE, &c.
APPLICATION FILED AUG. 27, 1908.
928,266.
Patented July 20, 1909.
4 SHEETS—SHEET 1.
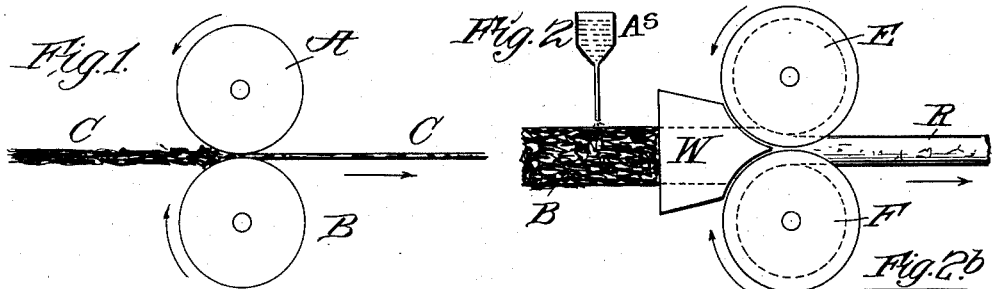
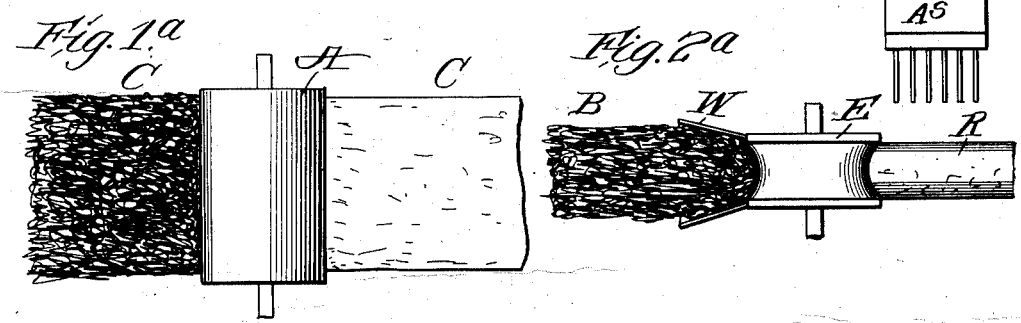
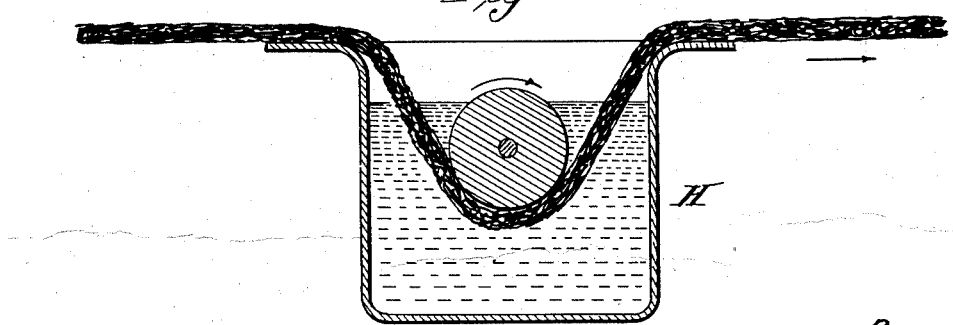
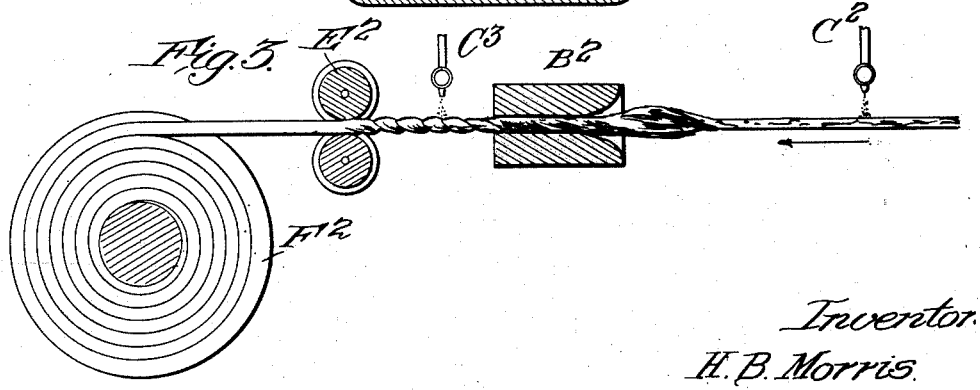
Inventor.
H. B. Morris.
By his Attorneys:
Baldwin Wight H. B. MORRIS.
METHOD OF MANUFACTURING MATERIAL FOR MAKING ARTICLES OF FURNITURE, &c.
APPLICATION FILED AUG. 27, 1908.
928,266.
Patented July 20, 1909.
4 SHEETS—SHEET 2.
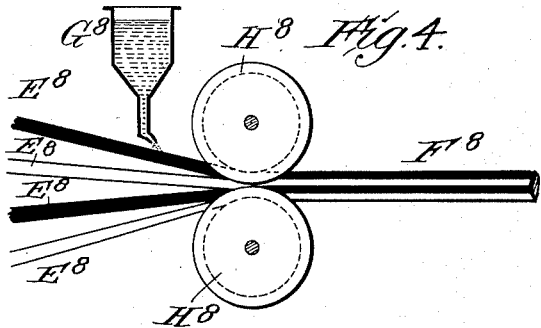
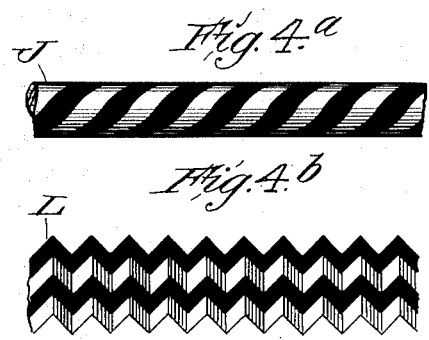
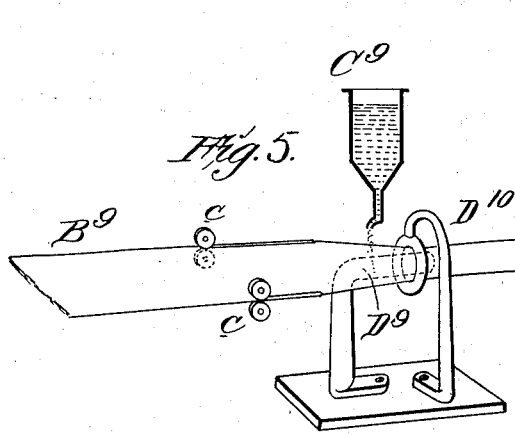
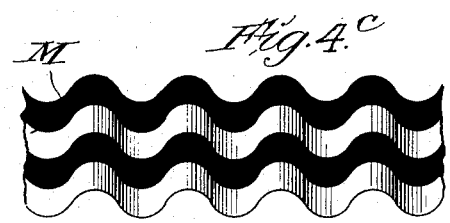
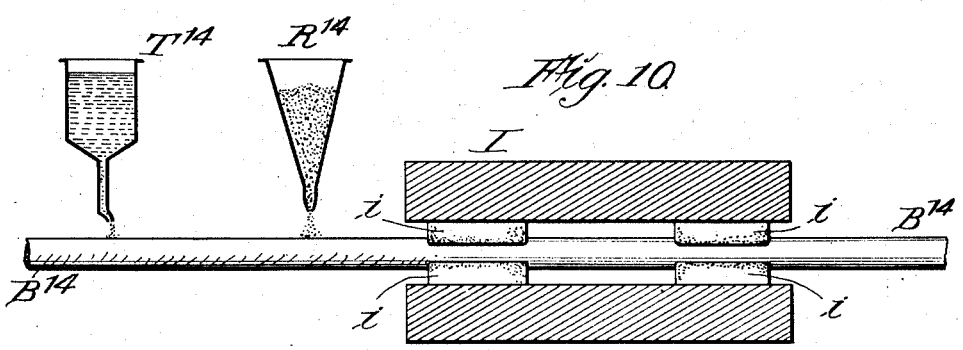

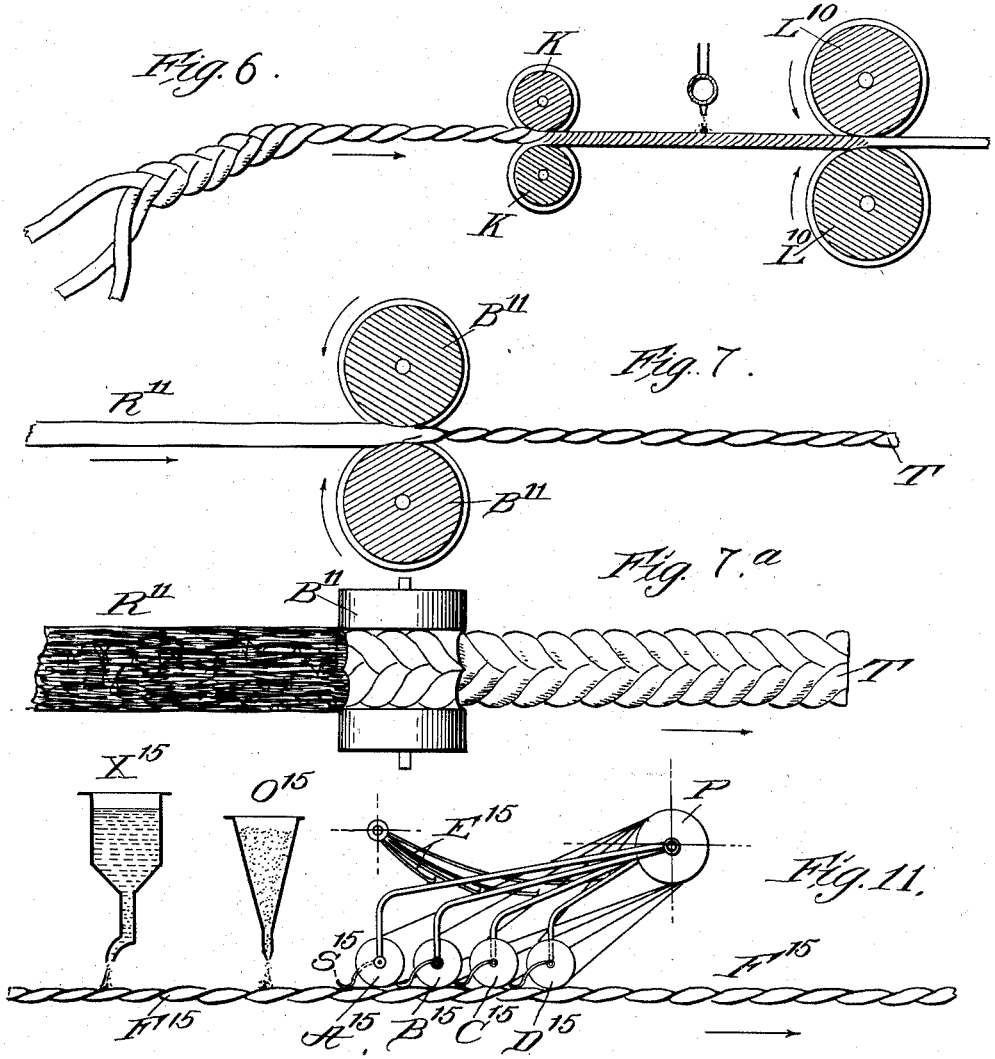

H. B. MORRIS.
METHOD OF MANUFACTURING MATERIAL FOR MAKING ARTICLES OF FURNITURE, &c.
APPLICATION FILED AUG. 27, 1908.
928,266.
Patented July 20, 1909.
4 SHEETS—SHEET 4.
Fig. 8.
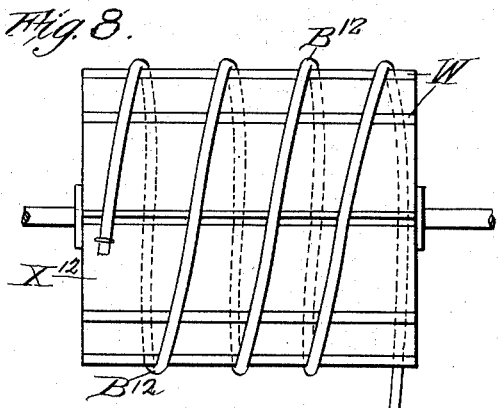
Fig. 9.
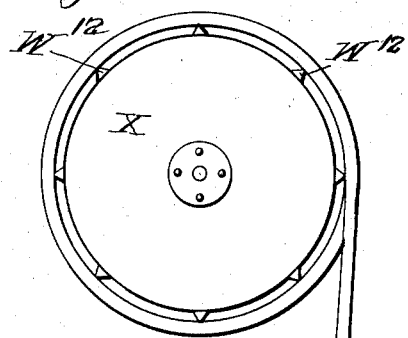
Fig. 12.
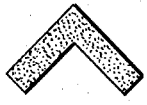
Fig. 12a.
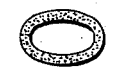
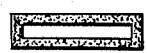
Witnesses:
P. J. Gathmann
E. D. Franzoni
Inventor:
H. B. Morris.
By his Attorneys:
Baldwin Wight

UNITED STATES PATENT OFFICE.

HAROLD B. MORRIS, OF MICHIGAN CITY, INDIANA.

METHOD OF MANUFACTURING MATERIAL FOR MAKING ARTICLES OF FURNITURE, &c.

No. 928,266.  Specification of Letters Patent.  Patented July 20, 1909.

Application filed August 27, 1908. Serial No. 450,417.

*To all whom it may concern:*

Be it known that I, HAROLD B. MORRIS, a citizen of the United States, residing in Michigan City, in the county of Laporte and State of Indiana, have invented certain new and useful Improvements in the Methods of Manufacturing Material for Making Articles of Furniture, &c., of which the following is a specification.

The principal object of this invention is to produce a new material for use in the manufacture of chairs, settees, and other articles of furniture where reed, ratan, or flag is now commonly employed.

According to my invention I employ as the foundation of the material, vegetable fibers, such as hay, straw or grass, wood fibers, strips or scraps of leather, scraps or strips of ratan, scraps or strips of cane or bamboo, tow, refuse hair, feather fiber, scraps of woolen or cotton cloth, or other vegetable or animal fibers of like nature. I preferably employ wood or vegetable fibers and so far I have obtained the best results by using excelsior which is wood fiber in a shredded condition. I treat this fibrous material in such manner as to form it into strands or cords of any desired length and of the requisite thickness, diameter or width and render it so strong, and, where necessary, so flexible, that it may be employed with facility to produce articles of pleasing appearance and of durability. Such cords or strands may be made of indefinite lengths and of any desired cross section and may, when desirable, be united with each other to make a larger and stronger strand in any desired way, as, for instance, by braiding them together. Several strands or cords may be assembled and twisted to form a larger strand, or several cords may be first braided and then twisted.

Any desired ornamentation may be given to the strands, cords, or braids by suitable dies or like devices. A woven fabric may be made from the material produced in accordance with my invention, such material forming the whole or a part of the fabric.

Various color effects may be obtained by staining or dyeing the material and preferably this is done by staining or dyeing the loose mass or masses of the fibrous material before such mass or masses are treated with adhesive material. The manner in which I carry out my invention is hereinafter more particularly described.

While my improved material is especially intended for use in making articles of furniture, such as chairs, it may also be used in the construction of baskets, baby-carriages and many other articles.

I am aware that strands, or cords have been made from strips of Manila paper treated with adhesive material for a similar purpose, and I am also aware that ropes have been made from straw and that ropes made of jute and the like have been tarred, but my invention contemplates treating fibrous material in a loose shredded or filamentous condition with adhesive material in mass before the fibers are united together by any process of pulping or compressing and in then assembling the loose fibers to give proper shape to the mass and work them into the desired article, such as a cord, sheet, or the like.

In the accompanying drawings I have shown diagrammatically the best ways now known to me of carrying out my invention. It will be understood, however, that the apparatus and processes are shown conventionally or diagrammatically and may be varied within wide limits.

Figures 1 and 1$^a$ illustrate how a mass of fibrous material may be rolled to flatten not only the mass, but also the individual fibers. Figs. 2, 2$^a$, and 2$^b$ show apparatus for forming a flattened mass of fibers into a cord, strand, imitation reed, or the like. Fig. 2$^c$ shows how the fibers may be passed through a bath of adhesive material preparatory to being formed into a cord or the like. In Figs. 2 and 2$^a$ spraying apparatus is shown for applying adhesive material to the fibers just before they are compressed and formed into a cord and in these figures of the drawings the cord is formed without any spinning or twisting operation. Fig. 3 illustrates how a mass of fibers may be spun or twisted in being formed into a cord or the like. Figs. 4, 4$^a$, 4$^b$, and 4$^c$ show how variously colored cords, etc. may be made according to my invention. Figs. 5, 5$^a$, and 5$^b$ show how a hollow strand, cord or the like may be formed. Fig. 6 shows how a braid formed from cords made in accordance with my invention may be twisted and how the twisted braid may be rolled to harden and smooth it. Figs. 7 and 7$^a$ show how strands, cords or strips of my improved material may be embossed or given the desired shape or surface ornamentation. Figs. 8 and 9 show how a cord, strand, braid or the like may be held while the finishing material applied to it is drying. Fig. 10 illustrates a rubbing or polishing device which may be employed. Figs. 11 and 11ª illustrate devices for rubbing or polishing cords, strands and the like having irregular surfaces. Figs. 12 and 12ª show a few of the many different cross-sectional shapes which may be given to cords, strands, etc. produced in accordance with my invention, whether the cords be solid or hollow.

I have already specified the kind of fibrous material which I employ. In cases where the fibers are cylindrical or of hollow form, as in the case of hay, straw, or grass, I preferably cut the mass of such material into comparatively small pieces in order to destroy all hollow or cylindrical formations so that the adhesive material may readily come in contact with practically all surfaces of the fibers. I also, where necessary, preferably cut the fibrous material into thin and narrow strips in order to render them more suitable to receive the adhesive material employed.

Where such material as leather is used, or where the material has a varnished, enameled or similarly finished surface, I preferably treat such material in such manner as to dissolve or remove this finishing material in order that the fibrous material may better absorb or receive the adhesive material which I employ. If the material is greasy or otherwise unsuitable to receive the adhesive material, I preferably remove such grease or the like in any suitable way. If the fibers are of a darker color than required, I bleach or whiten the mass of fibers by any suitable bleaching or whitening process.

It is not essential that fibrous material of all the same kind be employed, as fibrous materials of various kinds may be mixed and then treated with adhesive material and otherwise dealt with in the manner hereinbefore and hereinafter described, and, where necessary, the fibers may be combed before being treated with adhesive material. The fibrous material in a loose mass or masses may next be treated with adhesive material, but where it is desired to color the material or to produce a color or a variety of colors in the article, I dye, stain or color the mass or masses of fibers before treating them with adhesive material. It is best to have the mass of fibers dry before coloring them, and in order to dye the material I may immerse them in a receptacle containing dye in a liquid form. After dyeing the fibrous material, I preferably dry it preparatory to treating it with adhesive material. Where a solid color is desired, a single mass of fibrous material is colored. Where a variety of unsystematic color effects in the article is desired, masses of fibers of different colors may be mixed and then treated with adhesive material. The mass of fibers, either colored or not, is then treated with adhesive material. This may be done by immersing the mass in liquid adhesive material and allowing it to remain so immersed for a sufficient length of time for the fibers to become thoroughly soaked or impregnated with such material.

The adhesive material in many cases may be such that when it has become dry, or has assumed its permanent condition, it will be flexible and the article produced will be more or less flexible. A solution of glue mixed with a proper amount of glycerin may be used for this purpose. It is usually advisable to have the solution or bath of adhesive material heated while the fibers are immersed in it, and it is also advisable, as before stated, to have the fibers in a thoroughly dry condition before they are immersed in the solution. When the adhesive material employed is soluble in water I, in many cases, add to the bath a substance which will render the adhesive material, after it has become dry or set or has assumed its permanent condition, insoluble or nearly insoluble in water. For instance where a solution of glue is used for impregnating the fibers, the addition of a proper amount of bichromate of potash to the bath will aid in making the glue, when dry, practically insoluble in water, but other materials for this purpose well known in the arts may be used. The fibrous material thus impregnated with adhesive material, whether colored or not, may next be assembled by being passed between compressing rollers A and B, in the manner indicated in Fig. 1. This is preferably done before the adhesive material is entirely dry or set. By passing the mass of fibrous material between rollers in this way, the fibers are flattened in mass and individually and are made tougher and stronger and the adhesive material is made to penetrate them thoroughly, surplus adhesive material is squeezed out and form is given to the mass which can be conveniently handled in the subsequent steps of the process. While I prefer to use rollers, such as shown, other devices may be employed for the same purpose. Preferably the rollers or compressing devices A, B, are heated while operating on the mass of fibers and the fibrous mass is preferably so fed to the rollers that the flattened mass will be of substantially uniform texture. The flattened mass C may be given any desired width and may be used without further treatment, or this flattened mass may be embossed or otherwise treated for use as it is obvious that the heated compressing rolls A, B, may so compress the mass as to render it strong and durable. Obviously if the sheet C is too wide it may be cut into narrower strips.

The material thus produced may be further assembled or formed into cords, strands, reeds, etc. of indefinite or any desired length. One way in which a cord, strand, reed or the like may be produced is indicated in Figs. 2, 2$^a$ and 2$^b$. In these figures of the drawings, W indicates a guide for preventing lateral escape of the fibers as they approach the compressing rolls. R indicates the compressed cord, strand or the like, B$^1$ the mass of fibers to be compressed. A$^s$ indicates a device for spraying the fibers. As indicated, the entire width of the sheet of fibrous material may be sprayed in this way. The rollers E are given the proper form to give a proper cross section to the cord and suitable pressure is applied and the material is fed in such a way as to produce a cord of the desired size, texture and solidity. It will be observed that cords may be made in this way without twisting or spinning the fibers. Instead of spraying the sheet of fibrous material, in the manner indicated in Fig. 2, such sheet may be passed through a tank H containing adhesive material, as indicated in Fig. 2$^c$.

It is often desirable to spin or twist the material in order to further assemble the fibers to form a cord or the like therefrom. The manner in which this may be done is indicated in Fig. 3 where C$^3$ indicates a spraying device for the sheet or strip of fibrous material, B$^2$ a spinning or twisting device of any suitable kind, well known in the art, E$^2$ compressing rollers, and F$^2$ a reel on which the cord may be wound. The cord after being twisted and before being rolled, may be sprayed with adhesive material in the manner indicated at C$^2$. While it is usually desirable to pass the twisted cord through the rollers E$^2$, or other compressing devices, this step is not essential.

While I prefer to use adhesive material in a liquid form, such material may be in a powdered form and the rollers or other compressing devices may be heated so that the powdered adhesive material is melted and made to penetrate the fibrous material while being compressed, and even where liquid adhesive material is employed, by having the compressing mechanism heated, the adhesive material will be made to more quickly dry. If preferred pulverized adhesive material may be mixed with liquid adhesive material, or the fibrous material may be first treated with liquid adhesive material and then pulverized adhesive material added. As before stated, when it is desirable that the article produced shall be flexible, the adhesive material should be of such nature, or should contain such ingredients as to make it and the resulting article more or less flexible. The adhesive material either in a powdered or liquid form may be applied to the fibrous material in the manner illustrated or before described or at any other suitable time during the formation of the article.

I may make a strand, cord, imitation reed, etc., of ornamental appearance by uniting together, by the use of adhesive material and compressing devices, a number of cords or the like of different colors. A great variety of color effects is thus made possible.

In Fig. 4 E$^8$ indicates differently colored cords. F$^8$ indicates a single cord formed from the cords E$^8$ and united by the rolls H$^8$. G$^8$ indicates a receptacle containing adhesive material which may be applied to the cords E$^8$ just before they are compressed.

In Fig. 4$^a$, J indicates a cord which may be formed by twisting the cord F$^8$, shown in Fig. 4, to give different ornamental effects. In Figs 4$^b$ and 4$^c$, L and M indicate other ways in which the strip, strand or sheet may be ornamented by using cords or strands of different colors.

In some cases, as for instance, where economy is an essential feature, I make the cord or the like hollow in form in order to save material by means of suitable devices, such as those shown in Fig. 5. B$^9$ indicates a strip or ribbon of the material before it is rolled into hollow form. D$^9$ indicates a finger or mandrel over which the strip B$^9$ is rolled into hollow form. $c$ indicates rollers arranged to make sharp tapering edges on the strip B$^9$ prior to its being rolled and in order to form a good joint. C$^9$ indicates a vessel containing adhesive material which is fed to the strip while it is being made into tubular form. D$^{10}$ indicates a die coöperating with the mandrel D$^9$. A$^9$ indicates the hollow cord formed by the apparatus.

In Figs. 5$^a$ and 5$^b$, R$^9$ indicates cross sections of two of the forms which may be given to the hollow cord, but various other forms may be given to it as hereinafter described. I may in some cases, where desired, make a braid from a plurality of strands, cords or the like. These braids may be formed from strands in the manner indicated in Fig. 6 before the adhesive material contained in the cord is entirely dry, or adhesive material may be applied during the formation of the braid. Braids of the form shown in Fig. 6 may be used in constructing or covering chairs and other articles.

I may form a strand from a braid in the manner indicated in Fig. 6 by twisting the braid by means of suitable twisting devices K and may then compress the twisted braid by means of suitable compressing devices, such as L$^{10}$. Adhesive material may, as indicated, be applied to the twisted braid before it is compressed. A strand or cord formed in this way is very strong and durable. The individual cords composing the braid may be twisted or not as preferred and they may be of the same color or of different colors.

I may give various kinds of ornamentations to the sheets, braids or strips by means of suitable dies or other ornamenting devices. In Figs. 7, 7$^a$, B$^{11}$ indicates embossing rollers. R¹¹ indicates a single strip before it is embossed and T indicates the strip after the embossing process. In Fig. 7, I have shown how a twisted or spiral effect may be given to the cord. In Fig. 7ª I have shown how a braided effect may be given to a plain strip R¹¹ by means of the embossing rollers, no actual braiding taking place but the braid effect being produced entirely by the embossing process. Of course the embossing devices may be heated where necessary. Carving may, of course, be substituted for embossing, but this is a more expensive process and is not so desirable. When it is desired to produce a varnished, shellacked, or otherwise finished surface upon the cord, strand, sheet or the like, I may apply varnish or shellac or other finishing material to the surface of the same in any suitable way. The finishing material employed may be such that when dry or set, it will be more or less flexible so that the article may have a certain amount of flexibility or pliability.

In order to dry the material after the adhesive material is applied or after the varnish is applied, I may use the devices indicated in Figs. 8 and 9 where B¹² indicates the varnished, shellacked or finished cord. X¹² indicates a reel and W¹² indicates ribs on the reel to hold the cord away from the surface thereof in order that it may be better dried.

After the finishing material has been applied in the manner above specified it may be rubbed or otherwise treated to produce a smooth surface upon the finishing material and this may be polished, if desired, to produce a luster or shine upon the rubbed surface. In some cases the material may be rubbed or polished by passing it through a revolving cylinder I, (Fig. 10) provided with pads i of felt or similar material. In this figure, B¹⁴ indicates a cord to be rubbed or polished. T¹⁴ indicates a sprayer for oil, water, etc. and R¹⁴ indicates a sprayer for pumice stone, rotten stone or the like. For rubbing or polishing flat, square or other uniform shapes suitable revolving wheels provided with suitable rubbing or polishing materials may be used.

When rubbing or polishing the varnished, shellacked or otherwise finished surface of a cord, strand, or the like, the surface of which is irregular or unwoven, or has irregular indentations or elevations, I may use the rubbing or polishing devices shown in Fig. 11 where A¹⁵, B¹⁵, C¹⁵, D¹⁵, indicate rubbing or polishing rollers. F¹⁵ indicates the surface to be rubbed or polished. The rollers A¹⁵, B¹⁵, C¹⁵, D¹⁵, are revolved by means of small belts running in recesses or small grooves in the rollers. S¹⁵ indicates "feelers" to prevent the rollers from rubbing through the varnish, shellac or finish. X¹⁵ indicates a sprayer for water or oil. O¹⁵ indicates a sprayer for pumice, rotten stone or the like. E¹⁵ indicates springs to hold the rollers down against the work. By these devices all parts of the exposed surface of the material are made smooth and, if desired, lustrous. Other means for producing this effect may be employed.

The cords, etc. may be given a great variety of cross sectional shapes whether they are solid or hollow. Some of these are indicated in Figs. 12, 12ª.

Although the cords, strands, sheets or the like made in accordance with my invention may be made waterproof, in the manner before described, and while a sufficient amount of adhesive material may be employed when assembling the fibers, compressing them and otherwise treating them in the manner hereinbefore specified, I may, in some cases, dip or immerse the article, such as a chair, after it is made into a bath of diluted adhesive material which will insure the binding firmly together of all parts of the article and where a waterproof substance is contained in the bath it will serve to render the surface proof against any possibility of the entrance of moisture or water.

No claim is made herein to the article or articles herein described as such claims are made in my application No. 429,090, filed April 24, 1908.

I claim as my invention:—

1. The method of forming strands or cords for use in the manufacture of chairs or other articles which consists in treating loose shredded fibrous material with adhesive material, assembling and compressing the material thus treated and then further compressing and compacting the material to give it the desired form.

2. The method herein described of forming strands or cords which consists in dyeing or coloring a loose mass of shredded fibrous material, then treating the material thus colored with adhesive material, assembling the material thus treated and compressing it into the desired form.

3. The method herein described of forming strands or cords which consists in dyeing or coloring different masses of loose shredded fibrous material, treating these colored masses with adhesive material, assembling the material thus treated and compressing it into the desired form.

4. The method herein described of forming strands or cords which consists in treating loose shredded fibrous material with adhesive material, flattening the mass, treating the flattened mass with an additional supply of adhesive material and then compressing the material thus treated to give it the desired form.

5. The method herein described of forming strands or cords which consists in treating loose shredded fibrous material with adhesive material, assembling the material thus treated, compressing it into the desired form, treating the material thus assembled with an additional supply of adhesive material and then further compressing it to render it more smooth and symmetrical.

6. The method herein described of forming strands or cords which consists in treating loose shredded fibrous material with adhesive material, assembling the material thus treated and compressing it into the desired form and then ornamenting the surface of the material thus produced.

7. The herein described method which consists in treating loose shredded fibrous material with adhesive material, forming the material thus treated into cords and then braiding several of these cords together.

8. The method herein described which consists in treating loose shredded fibrous material with adhesive material, forming cords from the material thus treated, braiding several of these cords together and treating the braid with adhesive material.

9. The method herein described which consists in treating shredded fibrous material with adhesive material, forming the material thus treated into cords, braiding several of these cords together and then twisting the braid.

10. The method herein described which consists in treating shredded fibrous material with adhesive material, forming cords from the material thus treated, braiding several of these cords together, twisting the braid and treating it with adhesive material.

11. The method hereindescribed which consists in coloring different masses of shredded fibrous material, treating said masses with adhesive material, forming the masses into cords, braiding several of these cords together and treating the braid with adhesive material.

12. The method of forming strands or cords for use in the manufacture of chairs or other articles which consists in treating loose shredded fibrous material with adhesive material, spinning or twisting them into a cord, braiding several of these cords, and finally twisting the braid.

13. The method of forming strands or cords for use in the manufacture of chairs or other articles which consists in compressing a mass of loose shredded fibrous material to flatten the individual threads, treating the fibers with adhesive material, spinning or twisting them into a cord, braiding several of these cords, and twisting the braid.

14. The method hereindescribed of forming strands or cords which consists in treating excelsior with adhesive material, assembling the material thus treated and compressing it into the desired form.

15. The method of forming strands or cords for use in the manufacture of chairs or other articles which consists in impregnating excelsior with adhesive material and in spinning or twisting the material thus treated to form a cord or strand therefrom.

16. The method of forming strands or cords for use in the manufacture of chairs or other articles which consists in treating excelsior with adhesive material, assembling the material thus treated and compressing it into the desired form, then braiding several of the cords thus formed and twisting the braid thus produced.

17. The method hereindescribed of forming cords or strands which consists in treating loose shredded fibrous material with adhesive material, assembling the material thus treated and compressing it into the desired form and then uniting several of the compressed masses thus produced to form the desired article.

18. The method hereindescribed of forming strands or cords which consists in coloring different masses of shredded fibrous material, then treating them with adhesive material, assembling the fibers of the different masses and treating them with adhesive material and compressing them into the desired form and then uniting several of the compressed masses thus produced to form the desired article.

19. The method hereindescribed of forming strands or cords which consists in treating loose shredded fibrous material with adhesive material, assembling the material thus treated and compressing it into the desired form, then applying finishing material and then rubbing or polishing the finished article.

20. The method herein described of forming strands or cords for use in the manufacture of chairs or other articles, which consists in impregnating excelsior with adhesive material and then forming a cord or strand from such material.

In testimony whereof, I have hereunto subscribed my name.

HAROLD B. MORRIS.

Witnesses:
THOMAS I. GLASSCOTT,
EDWARD L. KRAUSE.